No. 832,943. PATENTED OCT. 9, 1906.
J. C. WHITRIDGE.
COUPLING SHANK.
APPLICATION FILED FEB. 28, 1905.
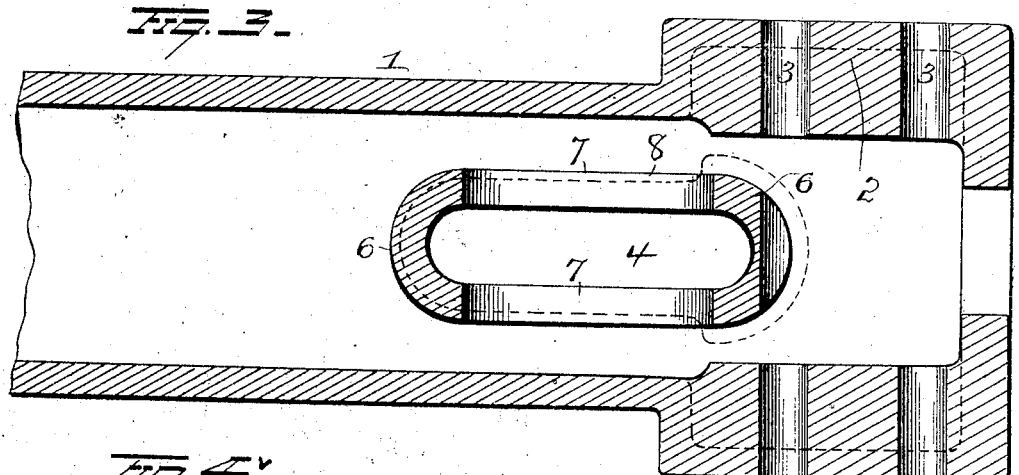
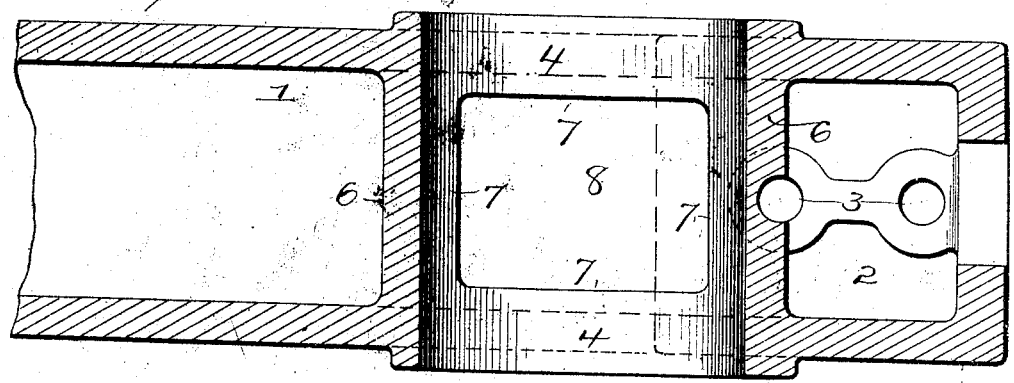
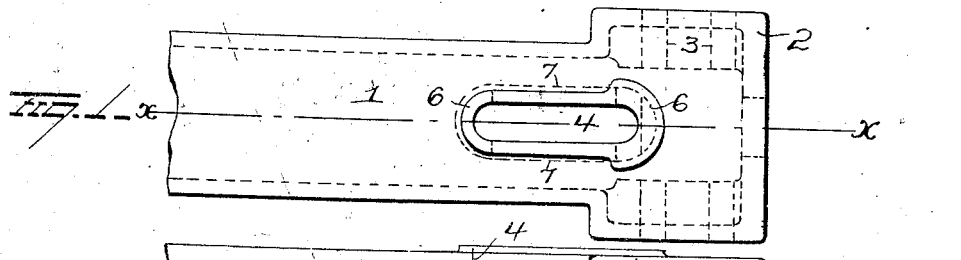
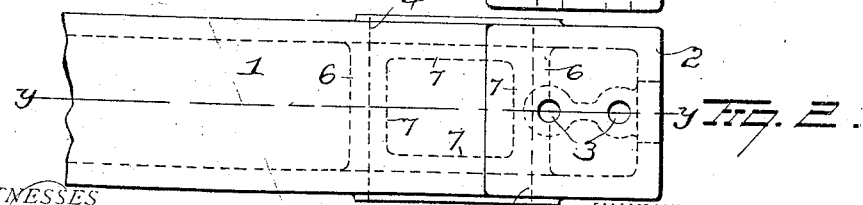
WITNESSES
INVENTOR
J. C. Whitridge
By H. A. Seymour

UNITED STATES PATENT OFFICE.

JOHN CLIFFORD WHITRIDGE, OF COLUMBUS, OHIO.

COUPLING-SHANK.

No. 832,943.　　　Specification of Letters Patent.　　　Patented Oct. 9, 1906.

Application filed February 28, 1905. Serial No. 247,787.

*To all whom it may concern:*

Be it known that I, JOHN CLIFFORD WHITRIDGE, a resident of Columbus, in the county of Franklin and State of Ohio, have invented certain new and useful Improvements in Coupler-Shanks; and I do hereby declare the following to be a full, clear, and exact description of the invention, such as will enable others skilled in the art to which it appertains to make and use the same.

My invention relates to an improved coupler-shank, the object of the invention being to construct a hollow shank with a wide contacting surface or bearing for the pin or key which connects the shank with the draft-gear, and thereby prevent wear of the parts and consequent lost motion and also by such construction strengthen this portion of the shank.

With this object in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a top plan view. Fig. 3 is a view in section on the line *y y* of Fig. 2, and Fig. 4 is a view in section on the line *x x* of Fig. 1.

1 represents the coupler-shank, having the enlarged end 2 made with openings 3 to receive securing-bolts.

The shank 1 comprises one integral casting having elongated slots or openings 4 in its sides to receive the key or pin connecting the coupler with the draft-gear. These slots or openings 4 have strengthening-ribs around them on the outer face of the shank to compensate for the weakened end due to the openings or slots, and integral webs or ribs 6 and 7 connect the walls of said openings or slots and extend from side to side of the shank and form a sleeve or bearing to receive the key or pin and present a wide wearing-face to prevent wear or reduce the wear to a minimum. The upper and lower webs or ribs 7 may be made with openings 8 to lighten the shank, or these webs may be dispensed with entirely, if preferred. Shanks, as heretofore made, without these connecting webs or ribs soon become worn at the slots or openings 4 in the sides of the shank and result in considerable lost motion, which necessitates the discarding of the coupler, though it may be perfect in all other respects, and by constructing the shank as above explained the wear will be slight, if any, the shank will be materially strengthened, the key or pin will not be liable to become cut or notched by the shank-walls, and the life of the coupler will be materially lengthened.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A hollow coupling-shank provided in its side walls with elongated slots, each of said slots closed at both ends, webs projecting inwardly from each side wall coincident with the ends of each of said slots, and ribs projecting outwardly from each side wall of the shank, coincident with the ends of each of said slots.

2. A hollow coupling-shank provided in its side walls with elongated slots, each of said slots closed at both ends, webs projecting from the side walls of the shank coincident with the walls of said slots throughout the full extent of slot-walls, and ribs projecting outwardly from the side walls of the shank and extending around the slots coincident with the walls of the latter.

3. A hollow coupling-shank having slots in its side walls, and cross-webs extending the full distance of the walls of the slots between the side walls of the shank and forming substantially full bearing-surfaces for the key to abut against.

In testimony whereof I have signed this specification in the presence of two subscribing witnesses.

JOHN CLIFFORD WHITRIDGE.

Witnesses:
　GEO. G. MERRING,
　F. G. BENNETT.